United States Patent [15] 3,665,536
Jackson [45] May 30, 1972

[54] LEVELING DEVICE

[72] Inventor: Harold G. Jackson, 3747 Fanwood Ave., Long Beach, Calif. 90808

[22] Filed: May 11, 1970

[21] Appl. No.: 35,987

[52] U.S. Cl. .................................................. 14/71, 318/676
[51] Int. Cl. ....................................................... B65g 11/00
[58] Field of Search ....................................... 14/71; 318/676

[56] References Cited

UNITED STATES PATENTS 3,038,185  6/1962  Moore ..................................... 14/71
3,086,152  4/1963  Lodjic et al. ........................... 318/676

Primary Examiner—Jacob L. Nackenoff
Attorney—Edward D. O'Brian

[57] ABSTRACT

A leveling device for use in maintaining a relative position between two structures, one of which can be moved if the other is moved so as to maintain the same relative position between the two structures can be constructed so as to utilize a suction cup carried on the structure which can be moved in response to movement of the other structure. In such a device the suction cup is carried upon a movably mounted member so that when motion is transmitted to the member through the suction cup the member causes actuation of motion detection means. Such means are connected to the structure which can be moved so as to cause movement of this structure in response to movement of the other structure.

6 Claims, 9 Drawing Figures

INVENTOR
HAROLD G. JACKSON
BY
EDWARD D. O'BRIAN
ATTORNEY

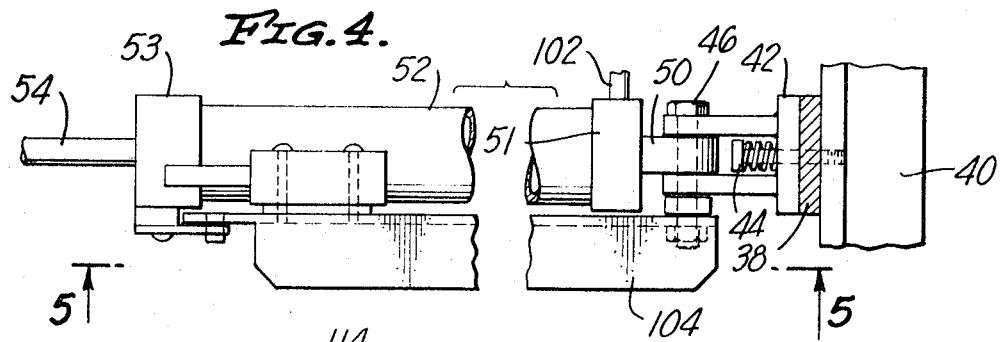
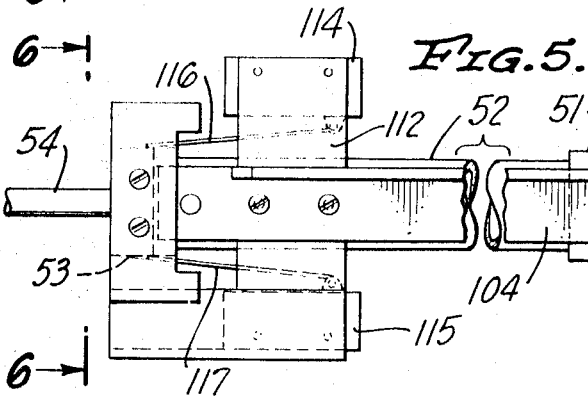
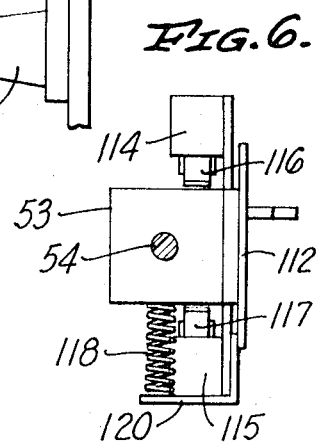
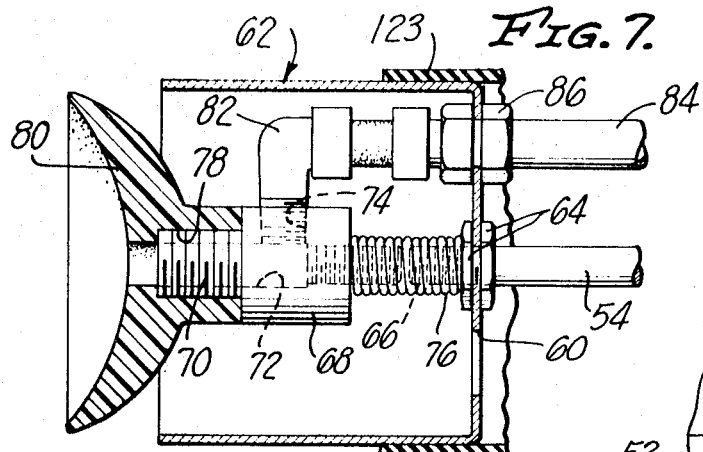
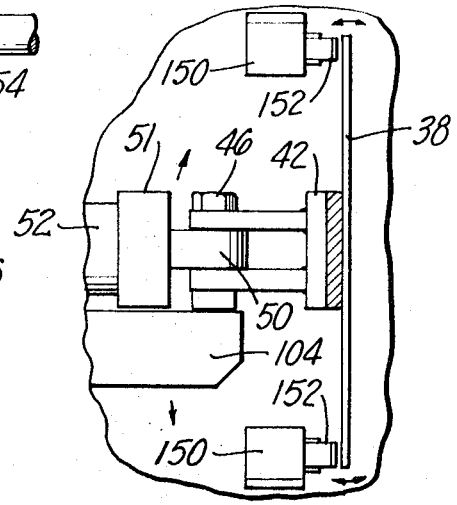
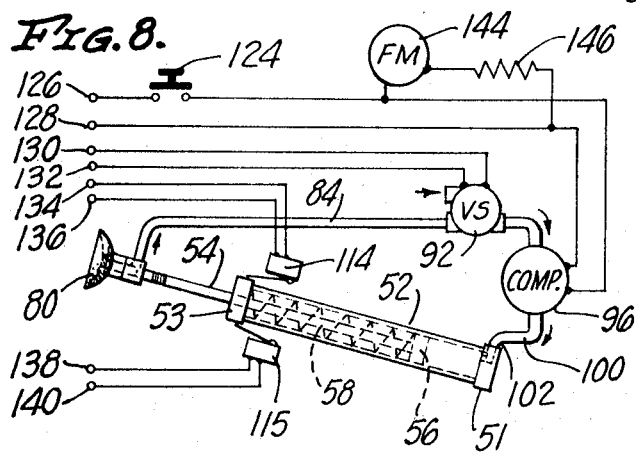
INVENTOR
HAROLD G. JACKSON
BY
EDWARD D. O'BRIAN
ATTORNEY

3,665,536

1

LEVELING DEVICE

BACKGROUND OF THE INVENTION

Leveling devices for use in maintaining a relative position between two structures, one of which can be moved if the other is moved so as to maintain the same relative position between the two structures are commonly utilized at the ends of aircraft loading bridges so as to constantly adjust the positions of such bridges to the positions of aircraft parked at them. The height of an aircraft above the ground frequently changes during loading and unloading operations at such a bridge as the weight within the aircraft varies. These leveling devices are used so as to maintain a constant relative position between a loading bridge in an aircraft in spite of such changes in the height or position of an aircraft.

In the past a number of different structures have been employed as leveling devices or have been suggested for such use. Usually such structures have been mounted upon the end of an aircraft loading bridge and have been constructed so as to physically engage an aircraft hull in order to detect hull movement. Thus, for example, a known leveling device for use with aircraft loading bridges includes a moveable arm which carries a wheel frictionally engaging an aircraft hull.

Although, unquestionably structures of this general type are utilitarian, they nevertheless are considered disadvantageous under certain circumstances for any of a variety of different reasons. At times, such structures can be difficult to conveniently mount in an unobtrusive location. Under adverse inclement weather conditions there may be problems as to the satisfactory operation of such devices. Thus, for example, with a structure as indicated in the preceding employing a rotatable wheel, there might be a danger of malfunction if ice should prevent or impede wheel rotation.

SUMMARY OF THE INVENTION

An understanding of the invention does not require a detailed consideration of all difficulties capable of being encountered with prior leveling devices for use with aircraft loading bridges or a detailed consideration of the various limitations of such devices. It is sufficient to say that one of the broad objectives of this invention is to provide new and improved leveling devices for use in maintaining a relative position between the end of an aircraft loading bridge and an aircraft hull.

It is not to be assumed from this that the invention is limited to leveling devices for this purpose. The leveling devices of this invention can be utilized wherever it is desired to maintain a relative position between two structures, one of which can be moved if the other is moved so as to maintain this relative position between the two structures. Thus, the leveling devices of this invention can be employed in other environments than the aircraft field such as in maintaining a relative position between the end of a loading bridge and a ship's hull or the like.

Further objectives of the present invention are to provide leveling devices for a purpose as described which may be constructed at a comparatively nominal cost, which are comparatively simple to operate, which are easy to service and maintain, which operate effectively in their intended purpose, and which will operate satisfactorily even under adverse or inclement weather conditions.

In accordance with this invention these objectives are achieved by providing a leveling device including a support for securing a device to one of two structures as indicated, a member movably mounted on said support so as to be movable with respect to it, a suction means for engaging the structure upon which the support is not mounted located on the movable member and a motion detection means located on the support adjacent to the movable member so as to be capable of detecting motion of this movable member.

With this structure the suction means engages one of two structures as described so as to cause movement of the movable member in response to the movement of the engaged structure. Such motion is transmitted through the suction means to the movable member so as to in turn cause the motion detection means to operate in order to cause an adjustment in the position of the structure which is not engaged by the suction means.

BRIEF DESCRIPTION OF THE DRAWINGS

The invention is best more fully explained with reference to the accompanying drawings in which:

FIG. 4 is an enlarged top plan view, partially broken away, showing an assembly within the leveling device indicated in the preceding figures;

FIG. 5 is a side elevational view, partially broken away, taken in the direction of the line 5—5 of FIG. 4;

FIG. 6 is an end elevational view taken in the direction of the line 6—6 of FIG. 5;

FIG. 7 is a cross-sectional view of a suction structure and mounting within the leveling device shown in the preceding figures;

FIG. 8 is a diagrammatic view indicating how the leveling device shown in the preceding figures is connected so as to be operative for its intended purpose; and FIG. 9 is a partial sectional view indicating a modified form of a leveling device of the present invention.

Figure 1:
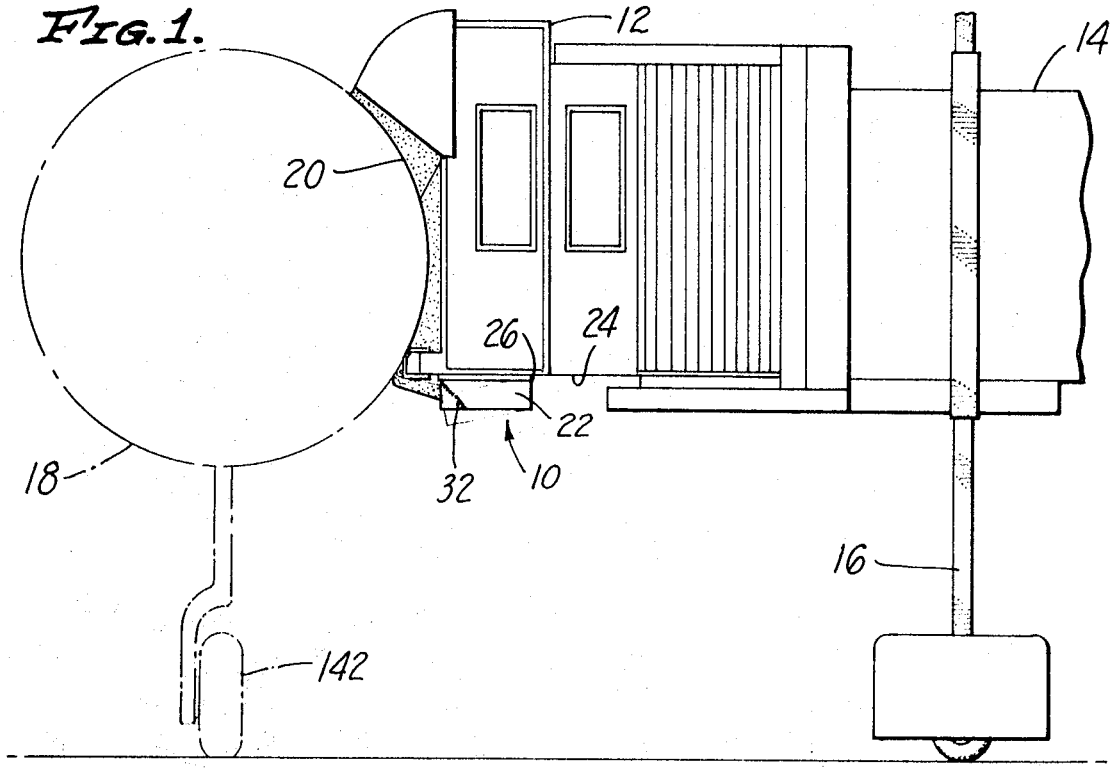
FIG. 1 is a side-elevational view showing the use of a presently preferred embodiment or form of a leveling device of the invention on an end of an aircraft loading bridge.

The manner in which the various objectives of this invention are achieved in a leveling device of this invention as well as various advantages of this invention will be apparent from a detailed examination and consideration of the drawings and of the remainder of this specification. From such an examination it will be apparent that the principal features of this invention may be embodied within various leveling devices which differ somewhat from the leveling device shown through the use or exercise of routine engineering skill.

DETAILED DESCRIPTION OF THE PREFERRED EMBODIMENT

In the drawings there is shown a leveling device 10 of the present invention mounted upon the movable or cab end 12 of an aircraft loading bridge 14. The particular bridge 14 illustrated is supported upon a movable carriage 16 capable of being actuated so as to either raise or lower the bridge 14 itself or so as to change the angle at which the bridge 14 extends from a mounting structure such as an aircraft terminal (not shown). The bridge 14 and the carriage 16 may be constructed in any desired manner. Bridges such as the bridge 14 and carriages such as the carriage 16 are known and are commonly used.

The device 10 is utilized so as to maintain a relative position between an aircraft hull 18 and a canopy 20 located upon the end 12 of the bridge 14. Normally such a canopy 20 is used so as to enclose the area around a door (not shown) in the hull 18 so that such a door is accessible through the bridge 14. As the hull 18 of an aircraft is loaded or unloaded this hull 18 will either move close to the ground or will move away from the ground because of the action of the suspension system used with aircraft wheels to support the hull 18. If the bridge 14 were not moved in accordance with such motion of the hull 18, the desired alignment or relative position between the end 12 of the bridge 14 and the hull 18 would not be maintained. The device 10 is employed to govern the operation of the carriage 16 so as to maintain a desired relative position between the two structures—the bridge 14 and the hull 18 as the hull 18 moves in accordance with its load.

The device 10 includes a housing 22 which may be mounted on the undersurface 24 of the end 12 by means of a hinge 26. This housing 22 includes a top 28 and a bottom 30. The top 28 is normally maintained substantially flush against the surface 24 by means of a coil spring 32 extending between a mounting bracket 34 on the surface 24 and the bottom 30 of the housing 22. When the housing 22 is maintained in this position a forward end 36 of the housing 22 is located adjacent to, but is spaced from the portion of the end 12 which is designed to engage the hull 18.

Within the housing 22, a plate 38 is mounted by means of brackets 40 so as to extend between the top 28 and the bottom 30 at an angle to the bottom 30 as shown. A clevis 42 is mounted upon the plate 38 by means of bolts 44 so as to extend from this plate 38 towards the end 36. Preferably the plate 38 is constructed with a series of holes (not shown) so that the clevis 42 may be mounted anywhere along the length of this plate 38. This is so that the device 10 may be conveniently assembled in the field so as to fit different bridges and aircrafts in the most advantageous manner.

This clevis 42 carries a usual pivot bolt 46 serving as a support or support means as hereinafter indicated. This bolt 46 extends through an aperture 48 in a mounting bracket 50 located on an end 51 of a cylinder 52. A piston rod 54 extends from the cylinder 52 through the other end 53 of it. This piston rod 54 is secured to a usual piston 56 located within the cylinder 52 and is normally maintained in a non use, withdrawn position by means of a spring 58 within the cylinder 52. It will be noted that the spring 58 bears against the end 53 of the cylinder 52 and against the piston 56. With this structure both the cylinder 52 and the piston rod 54 may be rotated in a vertical plane about the bolt 46.

The end of the piston rod 54 remote from the cylinder 52 extends through the base 60 of a mounting cup 62 as shown in FIG. 7 of the drawing. Preferably the rod 54 is secured to this base 60 by the use of nuts 64 threaded on a threaded portion 66 of the exterior 56 of the rod 54. The extremity of the piston rod 54 is located within the cup 62 and is threaded into a small fitting 68. This fitting 68 has a threaded nipple 70 which extends from it in alignment with the piston rod 54. This fitting 68 also includes an internal passage 72 leading through the nipple 70. The fitting 68 also includes a threaded opening 74 which is in communication with the passage 72. If desired a small protective spring 76 may be located around the portion 66 between the fitting 68 and one of the nuts 64.

In the device 10 the nipple 70 is threaded into an opening 78 leading to the center of the interior of a suction cup 80. This suction cup 80 appears much as a common suction type device such as is commonly referred to as a "plumber's friend." it preferably is formed out of a resilient, deformable, elastic material such as a known natural or synethic rubber composition. In the device 10 this cup 80 may be referred to as a "suction means" since it is intended to be used to engage the hull 18 so as to move therewith by a suction type holding action.

The opening 74 is attached by way of a common elbow 82 to a rigid tube or conduit 84 extending parallel to the piston rod 54. This tube 84 may include a coupling 86 engaged with the base 60 of the cup 62 so as to stabilize its position. The extremity of the tube 84 remote from the fitting 68 is attached by another coupling 88 to a flexible tube 90. This tube 90 leads to and from a known type of vacuum operated electric switch 92 so as to be connected to the inlet 94 of a common electric air compressor 96 mounted upon the bottom 30 of the housing 22. The outlet 98 of this compressor 96 is connected by another flexible tube 100 to an inlet 102 in the end 51 of the cylinder 52.

Figure 2:
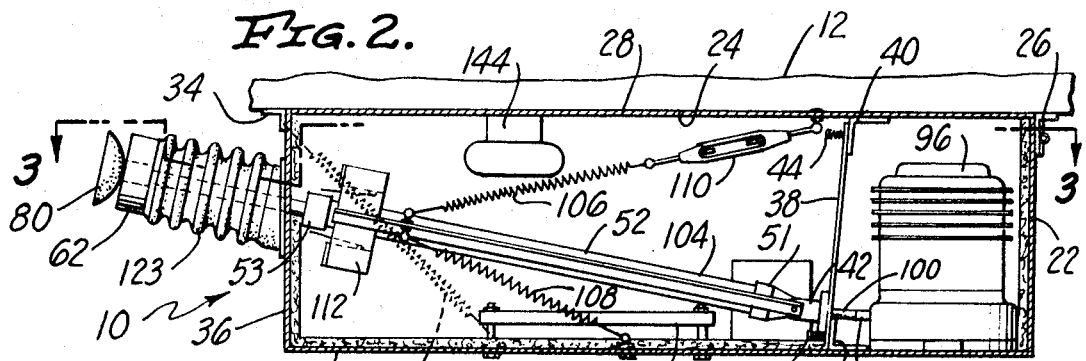
FIG. 2 is a side-elevational view of the device shown in FIG. 1 with a side cover removed from the housing of this device.
Figure 3:
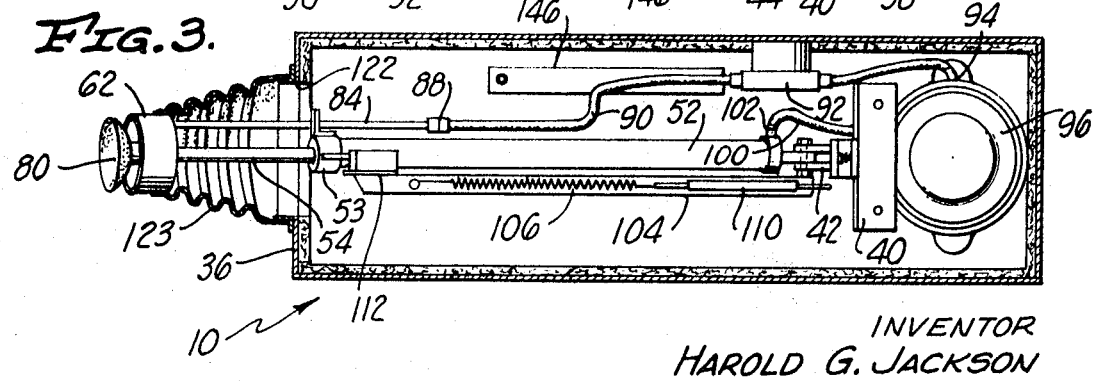
FIG. 3 is a cross-sectional view taken at line 3—3 of FIG. 2.

The clevis blot 46 pivotally supports a rigid member or mounting 104 which extends from the device 42, generally in the same direction as the cylinder 52. This member 104 is biased by means of springs 106 and 108 with respect to the top 28 and the bottom 30 of the housing 22 as shown in FIG. 2 of the drawing. At least one of the springs 106 or 108 preferably includes in series a common turn buckle 110 so that a position of the member 104 may be adjusted as desired with respect to the housing 22. With this mounting using the springs 106 and 108 the member 104 is normally held against movement with respect to the housing 22.

The extremity of the member 104 remote from the clevis 42 carries a mounting bracket 112 upon which there are located common electrical switches 114 and 115 adapted to be actuated through the movement of attached switch arms 116 and 117. These switch arms 116 and 117 are of such a dimension that they will be moved so as to actuate the switches 114 and 115 carrying them upon movement either up or down in a vertical plane of the cylinder 52 by contact with the end 53 of the cylinder 52. Movement of the cylinder 52 by the action of gravity so as to cause actuation of the lower switch arm 117 is prevented by the use of a small coil spring 118 extending between a bent end 120 of the bracket 112 and the end 53 of the cylinder 52.

The device 10 is normally assembled so that the piston rod 54 and the tube 84 extend outwardly from the housing 22 through an opening 122 in the end 36 in such a manner as to position the suction cup 80 a short distance from this end 36. It is considered preferable to connect the base 60 of the cup 62 to the end 36 by means of a flexible boot 123 such as an elastomeric boot in order to prevent snow, sleet, rain or the like from getting into the interior of the housing 22 through the opening 122.

During the use of the device 10 this device may be mounted as shown. When a remotely mounted on-off switch 124 connected in an operating power supply circuit including wires 126 and 128 is closed, power is supplied to the compressor 96. This will cause air to be drawn into the compressor 96 from the interior of the suction cup 80 through the structure described. Such air will be moved by the compressor 96 into the inlet 102 of the cylinder 52 so as to move the piston 56 toward the end 53 and so as to move the piston rod 54 outwardly from the end 36.

This will bring the suction cup 80 into contact with a hull such as the hull 18 of an aircraft located generally at the bridge 14. Because of its pliable, resilient nature of the suction cup 80 this will not cause any damage to the hull 18, and the suction cup 80 will normally form a seal with the hull 18 around the center region of the suction cup 80 on such contact. Such a seal will either stop or effectively stop the flow of any air back to the compressor 96 through the cup 80 and the connected structure leading to the inlet 94.

As a result of this the amount of air which can be supplied to the cylinder 52 by the compressor 96 is effectively cut off so that as the compressor 96 is operated further, there is no danger of the piston 56 being moved so as to cause the suction cup 80 to crush or otherwise damage the hull 18. When this state at which there is no further movement of the piston 56 is reached the vacumn switch 92 will be actuated so as to relay a signal through another circuit including wires 130 and 132 to a remote control where this signal will indicate that the device 10 is operative.

Thereafter, when the spacing between the hull 18 and the ground changes as a result of loading or unloading the hull 18 such movement will be transmitted to the suction cup 80 by virtue of the suction type connection established between the suction cup 80 and the hull 18. As a result of this such movement will be transmitted through the piston rod 54 connected to the suction cup 80 so as to cause rotation of the piston rod 54 and the cylinder 52 about the bolt 46.

Such rotation will cause actuation of either of the switch arms 116 and 117 depending upon whether it is up or down. This will cause one of the switches 114 and 115 to be closed, closing either a circuit including wires 134 and 136 or a circuit including wires 138 and 140 so as to cause operation of a conventional control mechanism for governing the operation of the carriage 16. Such operation of the switches 114 and 115 will cause the carriage 16 to be actuated so as to move the bridge 14 to maintain the same relative position between the end 12 and the hull 18 as existed prior to the movement of the hull 18.

If for any reason there should be a major movement of the hull 18 other than a movement of the magnitude caused by normal loading and unloading of the hull 18 such movement will be transmitted to the device 10 in the same manner as the movement resulting from normal loading and unloading operations. Such major movement is capable of being caused by something such as the nose wheel 142 of an aircraft hull 18 collapsing. If something such as this should occur the springs 106 and 108 will permit limited movement of the member 104 so as to prevent damage to the switches 114. Also in the event such major movement should occur the spring 32 will permit the housing 22 to rotate about the hinge 26 so as to avoid damage to the principal portions of the device 10. Normally during such major movement the suction cup 80 will normally disengage the hull 18 so that no damage will occur to the device 10.

In order to protect the device against possible maloperation do to formation, freezing or the like it is preferred to locate in parallel with the compressor 96 across the lines 126 and 128 a subcircuit including in series a thermostat switch 144 and a resistance heating element 146 as shown in FIG. 8. Both the thermostat 144 and the heating element 146 are preferably mounted within the interior of the housing 22 as shown in FIG. 2 of the drawing.

Normally the position of the length of an aircraft hull such as the hull 18 relative to the direction of placement of an aircraft loading bridge such as the bridge 14 will remain fixed even though the elevation of such a hull 18 may change. If for any reason it is anticipated that the angle between the hull 18 and the bridge 14 will change it is possible to form the brackets 40 so that they will operate as pivots to permit relative movement between the plate 38 and the housing 22. When this is done preferably two other switches 150 are mounted on the bottom 30 of the housing 22 so that their switch arms 152 are capable of being engaged by the plate 38 as it rotates. This feature which can be incorporated into the device 10 if desired is illustrated in FIG. 9 of the drawing. When the switches 150 are used they should of course be incorporated into appropriate control circuits so as to cause movement of the carriage 16 relative to the hull 18 in the same manner in which vertical movement is caused by the switches 114 and 115.

From a careful consideration of the preceding it will be realized that the device 10 is essentially a relatively simple, effective device for its intended utilization. It can be utilized so as to maintain a relative position between any two structures one of which is capable of being moved if the other moves so as to maintain an initial relative position between these two structures. For such use a device such as the device 10 may be mounted on either of such two structures so long as it is connected to the structure which is moved in response to movement by the other.

In the device 10 the assembly of the cylinder 52 and the piston rod 54 is considered to constitute a single structure or holding means mounted upon the housing 22 for the purpose of supporting or holding the suction cup 80. Because of the structure of this assembly it may be considered as an extensible means since the piston rod 54 may be moved so as to move the suction cup 80 outwardly into contact with a hull such as the hull 18. The suction cup 80 used need not be connected or used so that a vacumn is drawn through it when the device 10 is utilized in some applications. Thus, a common plumer's suction cup can be employed in a useable device corresponding to the device 10 which omitts the structure for drawing air through such a cup.

The assembly of the bracket 112 and the switches 114 and 115 in the device 10 may be termed a "motion detecting means" since the function of the switches 114 and 115 is to detect motion of the assembly of the cylinder 52 and the piston rod 54. When such motion is detected it is of course used for a control function with a movable structure such as the bridge 14. The particular motion detecting means as herein described is mounted by means of the springs 106 and 108 so that it is incapable of movement during normal movement of the suction cup 80 and the assembly of the cylinder 52 and the piston rod 54 as is caused by normal loading and unloading of a hull such as the hull 18. Nevertheless, these springs 106 and 108 accomplish this mounting function in such a manner that significant movement will cause limited movement to prevent damage of what are referred to herein as motion detection means.

I claim:

1. A leveling device for use in maintaining a relative position between two structures, one of which is capable of being moved if the other moves so that the relative position is maintained by movement of the structure which is capable of being moved, said device comprising:

a support means for mounting said device on a first one of said structures, said support means being adapted to be secured to said first of said structures, a holding means for holding a suction means, said holding means being pivotally mounted on said support means so as to be capable of movement with respect to said support means, suction means for engagement with the second of said structures connected to said holding means so as to extend therefrom, said suction means being capable of being held by suction against the second of said structures so as to transmit movement of the second of said structures to said holding means in order to cause movement of said holding means relative to said support means, said suction means being a suction cup, means for pulling a vacuum in the interior of said suction cup so as to firmly hold said suction cup in contact with said second of said structures when said suction cup is located against said second of said structures, said means for pulling a vacuum being connected to the interior of said suction cup, motion detection means for detecting motion of said holding means relative to said support means mounted on said support means so as to be capable of being actuated upon movement of said holding means, said motion detection means being adapted to be connected to said one of said structures so as to cause movement of said one of said structures in accordance with the actuation of said motion detection means.

2. A leveling device as claimed in claim 1 wherein:

said motion detection means includes a member pivotally mounted on said support means, said device including resilient mounting means connecting said member to said support means so as to prevent movement of said member during normal pivotal movement of said holding means, said mounting means permitting movement of said member which might cause damage.

3. A leveling device as claimed in claim 1 wherein:

said holding means comprises a cylinder pivotally mounted on said support means, a piston within said cylinder and a piston rod attached to said piston so as to extend from said cylinder, said suction means is mounted on said piston rod, said holding means includes a spring biasing said piston and said piston rod away from an extended position of said suction means, said device including:

means for moving said piston so as to move said suction means outwardly from said support means, said means for moving said piston being an air compressor, the outlet of which is connected to said cylinder.

4. A leveling device as claimed in claim 3 wherein:

said means for pulling a vacuum is said air compressor, and the inlet to said air compressor is connected to the interior of said suction cup so that upon operation of said air compressor air to said piston will be drawn from within said suction cup and so that upon the engagement of said suction cup against the second of said structures said suction cup will form a seal so that no additional air will be drawn into said air compressor and that therefore said air compressor will be inoperative during its continued operation to further move said piston.

5. A leveling device as claimed in claim 1 wherein:

said holding means is pivotally mounted on said support means so as to be capable of being rotated in a vertical plane and said motion detection means includes switch means located above and below said holding means, said motion detection means includes a member movably mounted on said support means, said switch means are mounted upon said member, said device including resilient mounting means connecting said member to said support means so as to prevent movement of said member during normal pivotal movement of said holding means, said mounting means permitting movement of said member which might cause damage to said switch means, said holding means comprises a cylinder pivotally mounted on said support means, a piston within said sylinder and a piston rod attached to said piston so as to extend from said cylinder, said suction means is mounted on said piston rod, said device including:

means for moving said piston so as to move said suction means outwardly from said support means, said holding means includes a spring biasing said piston and said piston rod away from an extended position of said suction means, said means for moving said piston is an air compressor, the outlet of which is connected to said cylinder, said means for pulling a vacuum is said air compressor and the inlet to said air compressor is connected to the interior of said suction cup so that upon operation of said air compressor air to said piston will be drawn from within said suction cup and so that upon the engagement of said suction cup against the second of said structures said suction cup will form a seal so that no additional air will be drawn into said compressor and that therefore said air compressor will be inoperative during its continued operation to further move said piston.

6. In a structure in which a suction cup is held against a surface, the improvement which comprises:

a cylinder being mounted on said structure, said cylinder having a piston located therein, a piston rod attached to said piston extending from said cylinder, said suction cup being mounted on said piston rod, an air compressor having an inlet and an outlet, said inlet being connected to the interior of said suction cup and said outlet being connected to said cylinder so that air compressed by said air compressor will move said piston so as to move said piston rod and said suction cup outwardly from said cylinder until said suction cup comes in engagement with said surface, the engagement of said suction cup with said surface forming a seal between the interior of said suction cup and the ambient air, such seal preventing air from being drawn into said compressor through said suction cup, such lack of air being drawn into said air compressor resulting in said compressor not compressing further air and not conveying further air to said cylinder so that said piston rod and said suction cup are not moved outwardly to any further extent from said cylinder after said suction cup is brought into engagement with said surface.

* * * * *